March 9, 1926. 1,576,445
W. B. MITCHELL
INSTRUMENT OR APPARATUS FOR INDICATING THE FLOW OR CONSUMPTION
OF LIQUIDS SUCH AS LIQUID FUEL
Filed Nov. 10, 1922 2 Sheets-Sheet 1
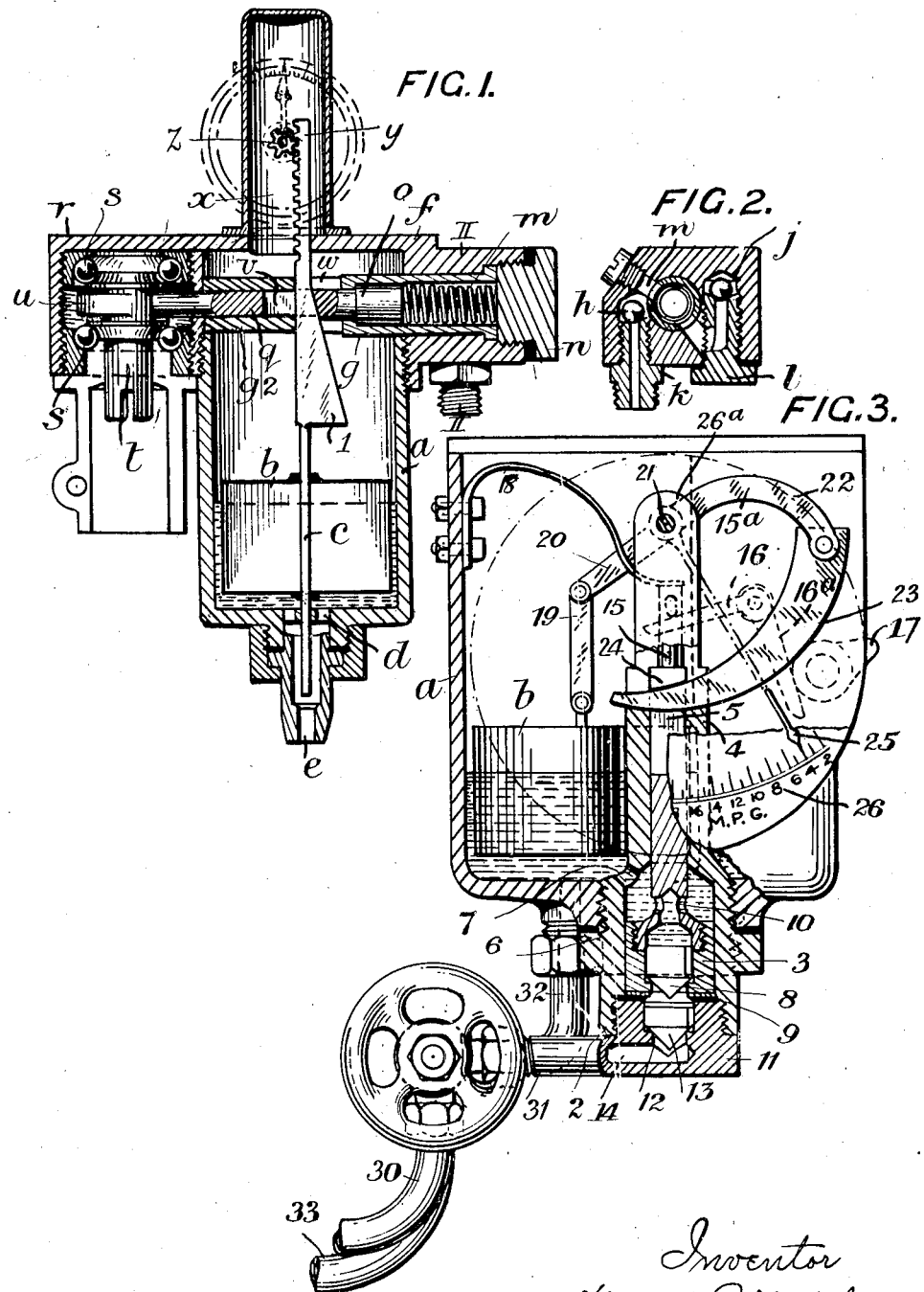

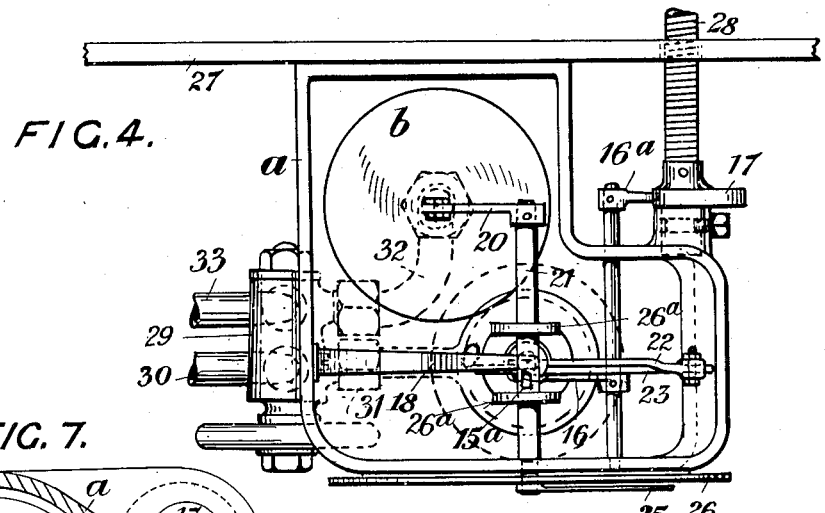
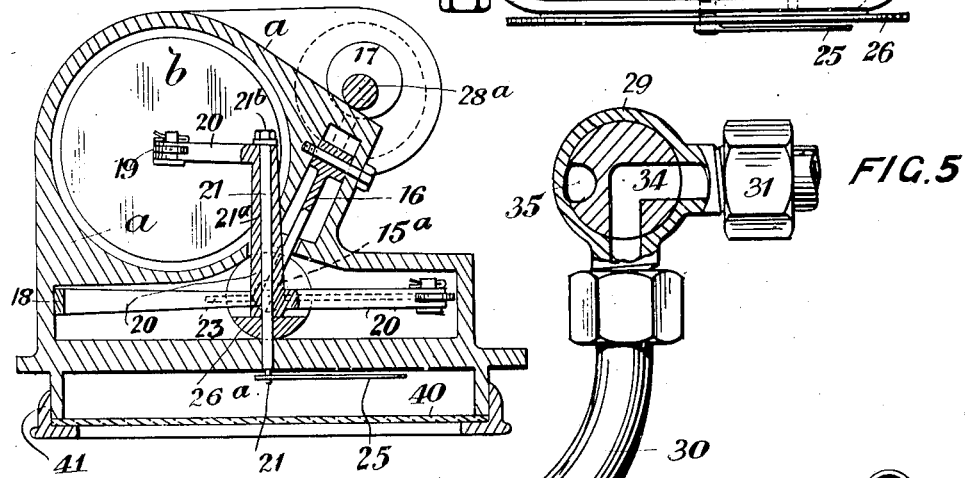
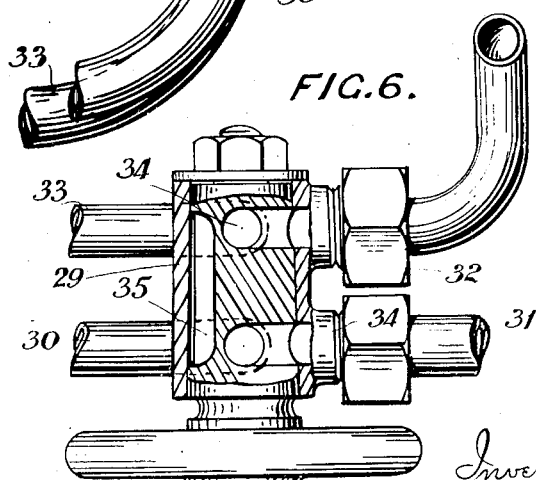

Patented Mar. 9, 1926.

1,576,445

UNITED STATES PATENT OFFICE.

WILFRID B. MITCHELL, OF LISBON, PORTUGAL.

INSTRUMENT OR APPARATUS FOR INDICATING THE FLOW OR CONSUMPTION OF LIQUIDS SUCH AS LIQUID FUEL.

Application filed November 10, 1922. Serial No. 600,172.

*To all whom it may concern:*

Be it known that I, WILFRID BARNARD MITCHELL, a subject of the King of Great Britain, residing at No. 26 Travessa da Ribeira Nova, Lisbon, Portugal, have invented a certain new and Improved Instrument or Apparatus for Indicating the Flow or Consumption of Liquids Such as Liquid Fuel, of which the following is a specification.

This invention relates to a new or improved instrument or apparatus for indicating the flow or consumption of liquids such as liquid fuel.

The principal object of the invention is to provide a simple and efficient indicator adapted for indicating the consumption of liquid fuel in relation to work done by the engine consuming that fuel, as for example the rate of consumption per road mile of an automobile engine. An instrument which will indicate at any instant on a motor car the rate of fuel consumption in number of miles per gallon is much desired and this invention enables the requirements of motorists in this connection to be satisfied. The instrument, however, is not only applicable to automobile vehicles but also to motor driven boats and ships, or to stationary engines. In the latter application, the indication may be that of number of revolutions per gallon or per ton of fuel. On a motor boat or ship, the indication may be either in terms of revolutions per gallon or per ton, or in terms of knots per gallon or per ton. In the case of steam ships with oil fired furnaces, the indications may be in terms of knots per ton.

According to this invention, the liquid fuel is admitted into a chamber, before passing to the carburetter or place of consumption, under control of means working in accordance with, or driven by, the engine, and the amount of fuel present in this chamber at any instant exercises a control of the means working in accordance with or driven by the engine, and also of indicating means.

The means working in accordance with or driven by, the engine advantageously consists of a small pump operated by a cam driven from the engine or from the road wheels of the vehicle when employed on a motor car. The means for exercising a control and producing an indication by the amount of fuel present in the chamber at any instant, advantageously consists of a float and a cam like device and indicator in operative connection with the float, the cam like device being operative for varying the stroke of the pump. If desired, the movement of the float, which results in the alteration of the stroke of the pump may be indicated by any suitable electrical or hydraulic means, instead of by mechanical means.

The pump may be adapted for giving a continuous delivery into the chamber during normal working in preference to an intermittent delivery and is advantageously of the submerged type so that the plunger cannot possibly suck air. For this purpose, the plunger is advantageously of the combined displacement ram and bucket or piston variety adapted for giving delivery, during both strokes, of the liquid sucked during alternate strokes, and is situated in the bottom of the chamber where it is submerged by the liquid therein.

The preferred form of cam is a segmental wedge form circularly adjustable through the medium of a link and lever arrangement, so that the tapping of the plunger rod against this cam has no effect whatever on the indicator hand.

In order to enable this invention to be readily understood, reference is made to the accompanying drawings, illustrating two different constructions by way of example and in which:—

Figure 1 is a central vertical section of a construction in which the float controls the operation of the pump through the medium of a cam on a rod and operates the indicator hand through the medium of a rack on the said rod.

Figure 2 is a transverse section of the line II—II of Figure 1.

Figure 3 is a vertical section of a modified construction in which the float is connected by a link and lever with a circularly adjustable cam and with the indicating hand, and showing a control cock fitted to the connections at the bottom.

Figure 4 is a plan of the apparatus seen in Figure 3.

Figure 5 is a transverse vertical section of the control cock.

Figure 6 is a horizontal section of the said control cock.

Figure 7 is a plan view, similar as to

Figure 4, illustrating a modified arrangement of the parts similar or equivalent parts in the two figures being designated with the same reference letters and numerals.

According to the construction illustrated in Figure 1, the instrument comprises a chamber or well $a$ in which is situated a float $b$ with a rod $c$ moving in a guide $d$. In the centre of the bottom of the chamber or well $a$ there is an outlet $e$ which is connected to the carburetter of an engine, or to means associated with consuming devices such as burners. At the upper end of the chamber $a$ there is fixed or formed a fitting $f$ forming a mounting for a pump cylinder $g$, and also providing small suction and delivery chests $h$ and $j$, Figure 2, for the pump. In the suction chest $h$, as illustrated, there is a ball suction valve which normally rests on a seating upon the upper end of a hollow plug or nipple device $k$ formed with a screw threaded spigot part for connecting thereto, the supply pipe from the reservoir. In the delivery chest $j$ also there is a ball valve normally seating upon the upper end of a hollow plug $l$, the bore of the latter communicating by means of a lateral port with the delivery passage from the cylinder. The suction port $m$ giving communication between the chest $h$ and the cylinder is also seen in Figure 1 but the connection between the delivery chest $j$ and the interior of the chamber $a$ is not shown. The cylinder $g$ is inserted into a radial bore of the fitting $f$ and may be formed with a flange $g'$ at its outer end for seating in an enlarged mouth portion of the bore, as shown in Figure 1, a plug $n$ being screwed liquid-tightly into the said mouth so as to close the bore and hold the flanged end $g'$ of the cylinder $g$ tightly in its recess. The cylinder may be conical and seated against a conical seating or fitted in a tapered bore, or it may be secured liquid-tightly in any other appropriate manner.

The inner end of the cylinder $g$, which extends a little way across the interior space of the chamber or well $a$ is formed with a tubular extension $g^2$ which may reach to the opposite side of the chamber $a$, as shown in Figure 1. In the cylinder $g$ there is a small ram or plunger $o$ which is pressed towards the end of its inward stroke by a spring $p$ contained in the cylinder $g$ and disposed between the plug $n$ and the plunger $o$. The rod $q$ of the plunger $o$ passes slidably through the tubular extension $g^2$ and is guided thereby and its outer end passes through an aperture in the wall of the chamber $a$ into a cam chamber $r$. In the latter is revolubly mounted, as for example on ball bearings $s$ a short vertical spindle $t$ formed or fitted with a cam $u$ which is adapted for engaging with the end of the plunger rod $q$. The lower end of the spindle $t$ is adapted for being coupled with driving means such as a flexible shaft.

The plunger rod $q$ is formed with a slot $v$ in a vertical plane and the tubular guide $g^2$ is formed with slots $w$ also in a vertical plane. With the plunger $o$ at the inner end of its stroke, as seen in Figure 1, the slot $v$ in the rod $q$ overlaps the slots $w$ in the tubular guide $g^2$. The guided float rod $c$ passes upwardly through the slots $v$ and $w$ and extends upwards into a tubular chamber $x$ fitted over an aperture in the cover part of the apparatus. The upper end of the rod $c$ may be formed with a rack $y$ meshing with a pinion $z$ fixed on a horizontal indicator spindle revolubly mounted in the tubular chamber and having one end extending through a packed bearing in the wall of the chamber $x$. An indicator hand, seen in dotted lines is fixed to a projecting end of this spindle and works over a suitably graduated scale or dial also indicated in dotted lines. On an intermediate portion of the float rod $c$ there is formed or fixed a tapering or wedge-shaped cam plate 1, the narrow end of which extends into the overlapping portions of the slots $v$ and $w$.

In describing the operation, it will be assumed that this instrument is fitted on the dash board of a motor car and that the short cam spindle $t$ is coupled with a flexible shaft driven from a road wheel, or other part revolving in accordance with the distance travelled. Also, that the liquid fuel from the chamber or well $a$ flows to a carburetter which supplies the engine of the car with the combustible mixture. Upon the car being started, the spindle $t$ is revolved and the cam $u$ presses back the plunger rod $q$ so that the plunger $o$ makes a delivery stroke against the action of the spring $p$. This delivery takes place past the valve $j$ and into the chamber $a$ from which it flows through the outlet $e$ to the carburetter. The further revolution of the cam $u$ then permits the spring $p$ to return the plunger $o$ and during the stroke the plunger sucks in a fresh charge into the cylinder $g$ past the suction valve $h$. This pumping cycle is repeated for every revolution of the cam $u$. As the speed of the car increases, more liquid fuel may be passed by the pump into the chamber $a$ than is required by the engine. The level in the chamber $a$ then rises and lifts the float $b$ and its rod $c$ so that the tapered cam 1 on this rod is inserted farther into the overlapping slots $v$ $w$. Consequently, in the following strokes the plunger $o$ is unable to make its full return or suction stroke as it is arrested by the inclined surface of the cam plate 1 before reaching the end of the suction stroke. Therefore, a reduced quantity of liquid fuel is then passed by the pump to the chamber $a$. If this quantity is still too great, further rise of the float occurs and effects additional insertion of the cam plate 1 into the slots v w with consequent further shortening of the strokes of the pump. Equilibrium is soon reached, when the pump will be passing to the chamber a just that quantity of liquid fuel which is being taken by the engine. If the demand of the engine increases the level in the chamber a will fall, the float b will descend, and the cam plate 1 will permit the pump to increase its stroke. All these movements of the float will be indicated by the indicator hand which is operated by the rack y and pinion z, the said hand moving over the appropriate scale which can be easily graduated in such terms as have been mentioned above, as for example, in terms of numbers of miles per gallon. The plunger may be prevented from turning in its cylinder by any suitable means. The application of the instrument for use in any other one of the suggested uses will be readily apparent without further description.

According to the construction illustrated by Figures 3 and 4 a pump fitting is mounted towards one side of the well or chamber a, with the axis of the pump cylinder vertical. This fitting, as seen clearly in Figure 3 comprises a lower part 2 of enlarged bore for a bucket or plunger 3 to work in and an upper part or extension 4 of smaller bore for the plunger rod 5 to slide in. The cross sectional area of the rod 5 is one half of the cross sectional area of the plunger 3 for a purpose to be described. It will be noticed that the part 2 is formed with screw threads at 6 for screwing the fitting into the bottom of the chamber a and with a port or ports 7 for giving communication between the interior of the chamber a and the space in the pump cylinder above the plunger 3.

The plunger 3 is made hollow for the reception of a lift valve 8 which is adapted to seat downwardly upon a seating 9 in the plunger 3, the latter being formed with delivery ports 10 above this valve 8. In the bottom of the pump fitting there is a screw plug fitting 11 in which is a valve seat 12 and a downwardly seating suction valve 13 for closing the suction or admission passage 14.

An extension 15 on the upper end of the plunger rod 5 is provided with a projection 15ᵃ or is otherwise adapted to be engaged by a crank arm 16, a crank arm 16ᵃ on the same spindle (see also Figure 4) being operated by, for example, a cam 17 on a spindle driven by a flexible shaft from the engine or, in the case of a motor road vehicle, from one of the wheels. When driven from the engine the flexible shaft aforesaid may be coupled with the magneto spindle.

The revolution of the cam 17 rocks the arm 16ᵃ and causes the arm 16 to lift the plunger 3 at every revolution, against the action of a suitable spring, as for example the leaf spring 18 fixed to the interior of the chamber a and pressing down upon the top of the road extension 15. The spring 18 effects the return or down stroke of the plunger 3.

The float b in this construction is suspended by a link 19 from an arm 20 on a spindle 21. A second arm 22 fixed on the spindle 21 is pivotally connected with the wide end of a segmental wedge or cam blade 23, the narrow end of which extends beneath a shoulder or projection 24 on the upper end of the plunger rod 5. This projection 24 may be formed by removing a semi-cylindrical portion of the rod 5 starting from a short distance from the top and by shaping the under side of the projecting shoulder 24 so as to conform with the curvature of the inner side of the cam blade 23. The tubular extension or guide 4, in which the rod 5 slides, is slotted for the passage of the cam blade 23, the bottoms of these slots being curved to conform with the outer edge of the cam blade 23. The outer edge of the blade 23 is concentric with the spindle 21 but the inner edge thereof is eccentric. On the outer end of the spindle 21 is mounted an indicator hand 25 which moves around a circular or segmental dial or scale 26. The spindle 21 is shown supported in a bearing in the wall of the chamber a and also in bearings in ears or uprights 26ᵃ on the tubular extension 4 of the pump cylinder.

In operation and during every revolution of the cam 17 the plunger 3 is raised as aforesaid, against the action of the spring 18. During this stroke liquid is sucked in through the passage 14 and past the suction valve 13 into the space beneath the plunger 3. Liquid also is delivered from the space above the plunger 3, through the port 7 and into the float chamber a. At the completion of this stroke, the cam 17 permits the spring 18 to depress the plunger 3, whereupon the suction valve 13 closes on to its seat 12. Delivery of liquid, however, continues to take place through the port 7 owing to the volume of the rod 5 entering the space above the plunger 3 and reducing the capacity thereof to about one half of the capacity of the cylinder space beneath the plunger 3, when the latter is at the top of its stroke. Consequently there is a delivery at every stroke. Moreover, the plunger being at all times submerged, there is no possibility of suction of air and the delivery corresponds accurately with the displacements due to the movements of the plunger 3 and its rod 5. Piston rings may be fitted to the plunger, if desired.

When the float b is in its lowest position, the narrow tip of the cam blade 23 lies beneath the projection 24 of the plunger rod 5, so that the latter and its plunger are free to make the full descent at every downstroke. If circumstances bring about a reduction in fuel consumption, the level of liquid fuel in the well or chamber $a$ rises, thereby raising the float $b$. The latter, through the link 19 and arms 20 and 22 then circularly adjusts the cam blade 23 so that a deeper or wider portion of this blade comes beneath the shoulder or projection 24 for limiting the descent of the rod 5 and its plunger 3. Consequently, the delivery to the well or chamber $a$ is then reduced. Equilibrium is established as soon as the pump is adjusted for delivering the quantity consumed. The pointer 25 moving with or operated by the spindle 21 indicates at any instant on an appropriately graduated scale 26 the rate of consumption in terms of miles per gallon, kilometres, per litre and so on.

As shown in Figure 4, the instrument may be adapted for mounting on the dashboard 27 of a motor car, the flexible shafting for driving the cam 17 being indicated at 28. In order that the instrument may be put into or out of operation at will, a control cock 29, seen in detail in Figures 5 and 6, may be provided. The pipe 30 conveys the liquid fuel from the tank to the cock 29 and the connection 31 conveys it from the cock 29 to the suction or admission to the pump fitting 2. A connection 32 in the bottom of the chamber $a$ conveys the liquid fuel therefrom to the cock 29 and a pipe 33 conveys it from the cock to the carburetter. In the position of adjustment of the cock illustrated in the drawing, two L-shaped passages 34 in the plug of the cock put the pipe 30 in communication with the connection 31 and the connection 32 in communication with the pipe 33, so that the instrument is included in the petrol or liquid fuel circuit. By turning the plug of the cock through 90° from the position seen in Figure 5, a passage 35 formed parallel with the axis of the plug places the pipes 30 and 33 in direct communication, so that the petrol flows directly from the tank to the carburetter, and the instrument is put out of action.

The plunger may be prevented from turning in the pump cylinder by forming a groove in the latter which is engaged by a pin or projection on the plunger. Or, any other suitable means may be adopted for this purpose.

According to the modified arrangement of the parts illustrated in Figure 7, the cam 17 is an eccentric carried by a vertical spindle 28ª which is suitably driven, as by a flexible shaft. The spindle 28ª is preferably mounted in ball bearings and the cam 17 bears against an arm 16ª, as in Figure 4. In this modification, however, the arm 16ª is downwardly inclined and is formed in one piece with the arm 16 which extends upwardly from the pivot hub and is suitably arched or made like a swan neck so that its extremity extends downwardly and takes beneath a projection on the plunger rod 5 which is indicated by a dotted circle. The float $b$ is suspended by a link 19 from an arm 20 which in this modification is formed on one end of a hollow spindle 21ª, the arm 22 for operating the cam blade 23 being formed on the opposite end of such hollow spindle 21ª. The indicator hand 25 is carried by a spindle 21 which turns in bearings in the outer wall of the casing and in an upright support 26ª on the pump fitting as before. The hollow spindle 21ª is mounted on the spindle 21 and is secured thereto by a stud or the like 21ᵇ. The indicator hand 25 and a suitable dial may be contained in a recess which can be covered in by a glass 40 and ring frame 41.

The application to a motor car has been given as an example and the other uses of the instrument suggested in the earlier part of this specification will be readily apparent without further description.

It is apparent that various changes and modifications can be introduced into the construction of an instrument or apparatus of this kind without departing from the essential features of this invention.

I claim:

1. An apparatus for indicating the flow of a liquid, such as liquid fuel, comprising a fuel storage and distributing chamber having an inlet adapted to be connected with the supply and a separate outlet adapted to be connected with a place of consumption, admission control means driven in accordance with an engine deriving power from such liquid, regulating means influenced by the amount of liquid present at any instant in the chamber, operative connection between said regulating means and the admission control means to vary the admission, an indication device calibrated to indicate the flow of liquid, and operative connection between said regulating means and said indicating device whereby the state of the indicating device corresponds with the state of the adjustment of the regulating means.

2. An apparatus for indicating the rate of consumption of liquid fuel comprising a fuel storage chamber and distributing chamber adapted for connection with the fuel supply and place of consumption, a reciprocatory pump adapted for delivering charges of liquid into said chamber, a gravity operated float in said chamber, delivery control means operatively connected with said float and adapted for altering the delivery of said pump in accordance with the elevation or depression of said float, an indicator calibrated to indicate the rate of consumption of liquid, and an operative connection between said float and said indicator whereby the indication given corresponds with the state of adjustment of said delivery control.

3. An apparatus for indicating the rate of consumption of liquid fuel, comprising a fuel storage and distributing chamber having an inlet and a separate outlet adapted to be connected respectively with a fuel supply and a place of consumption, a variable capacity pump delivery into said chamber, a gravity operated float in the latter, delivery control means operatively connected with said float and adapted for altering the capacity of said pump in accordance with the movements of said float, an indicator calibrated to indicate the rate of consumption of liquid, and an operative connection between said float and said indicator, whereby the indication given corresponds with the state of adjustment of said delivery control means.

4. An apparatus for indicating the rate of consumption of liquid fuel comprising a fuel storage and distributing chamber having an inlet adapted for connection with the supply and a separate outlet adapted for connection with a place of consumption, a variable stroke reciprocatory pump delivering into said chamber, stroke-varying means operative on said pump, a gravity operated float in said chamber, an operative connection between said float and said stroke-varying means, an indicator calibrated to indicate the rate of consumption of liquid, and an operative connection between said float and said indicator whereby the indication given corresponds with the state of adjustment of said stroke varying means.

5. An apparatus for indicating the rate of consumption of liquid fuel comprising a fuel storage and distributing chamber adapted for connection with the place of consumption, a reciprocatory pump adapted for delivering into said chamber, driving means adapted for positively forcing the pump piston along one of its strokes, resilient means operative to return said piston, a variable stop device operative to engage said piston for variably arresting it during the said return, a gravity operated float in said chamber, an operative connection between said float and said variable stop, an indicator calibrated to indicate the rate of consumption of liquid, and an operative connection between said float and said indicator whereby the indication given corresponds with the state of adjustment of said variable stop.

6. An apparatus for indicating the rate of consumption of liquid fuel comprising a fuel storage and distributing chamber adapted for connection with the place of consumption, a reciprocatory pump adapted for delivering into said chamber, a revolving member adapted for driving the piston of the pump along one stroke, resilient means operative to return said piston, an adjustable cam device operative for variably arresting the piston in such return, a gravity operated float in said chamber, an operative connection between said float and said adjustable cam device, an indicator calibrated to indicate the rate of consumption of liquid, and an operative connection between said float and said indicator whereby the indication given corresponds with the state of adjustment of said adjustable cam device.

7. An apparatus for indicating the rate of consumption of liquid fuel, comprising a fuel storage and distributing chamber adapted for connection with the place of consumption, a reciprocatory pump in the bottom of said chamber, said pump being of the kind adapted for suction during alternate strokes and delivery during every stroke, a revolving member adapted for driving the piston of the pump along one stroke, resilient means operative to return said piston, an adjustable cam device operative for variably arresting the piston in such return, a gravity operated float in said chamber, an operative connection between said float and said adjustable cam device, an indicator calibrated to indicate the rate of consumption of liquid, and an operative connection between said float and said indicator whereby the indication given corresponds with the state of adjustment of said adjustable cam device.

8. An apparatus for indicating the rate of consumption of liquid fuel comprising a fuel storage and distributing chamber adapted for connection with the supply and place of consumption, a vertical reciprocatory pump disposed in the bottom of said chamber, said pump being adapted for suction during alternate strokes and delivery during every stroke, a revoluble cam, means for driving said cam, an operative connection between said cam and the plunger of said pump said cam operating to produce the lift and suction stroke of said plunger, a spring operative to resist the lift of said plunger and to produce the depression or return strokes of said plunger, an adjustable cam operative for variably arresting the plunger in said return, a gravity operated float in said chamber, an operative connection between said float and said adjustable cam device, an indicator calibrated to indicate the rate of consumption of liquid, and an operative connection between said float and said indicator whereby the indication given corresponds with the state of adjustment of said adjustable cam device.

9. An apparatus for indicating the rate of consumption of liquid fuel, comprising a fuel storage and distributing chamber adapted for connection with the supply and place of consumption, a pump adapted for delivering into said chamber and so disposed as to be constantly submerged, said pump being adapted for suction during alternate strokes and delivery during every stroke, a spring operative upon the pump plunger, mechanical means operative to produce alternate strokes of said pump against the action of said spring a gravity operated float in said chamber, an operative connection between said float and said pump, said operative connection being adapted for varying the stroke of said pump in accordance with the level of liquid at any instant in said chamber, an indicator calibrated to indicate the rate of consumption of liquid, and an operative connection between said float and said indicator whereby the indication given corresponds with the stroke of the pump.

10. An apparatus for indicating the rate of consumption of liquid fuel, comprising a fuel storage and distributing chamber adapted for connection with the supply and place of consumption, a vertically disposed pump in the bottom of said chamber, a spring operative upon the pump plunger, mechanical means operative to produce strokes of said pump against the action of said spring, a gravity operated float device in said chamber, an oscillatory arm mounted in bearings in said chamber, a link between said arm and said float, a curved plate of gradually increasing width pivotally connected with said arm, an abutment on the plunger of said pump, said abutment being adapted for engaging with said plate for the variable limitation of the spring-produced strokes of said plunger, an indicator calibrated to indicate the rate of consumption of liquid, and an operative connection between said float and said indicator, whereby the indication given corresponds with the state of adjustment of said curved plate.

11. An apparatus for indicating the rate of consumption of liquid fuel, comprising a fuel storage and distributing chamber adapted for connection with the place of consumption, a reciprocatory pump adapted for delivering charges of liquid into said chamber, a gravity operated float in said chamber, delivery control means operatively connected with said float and adapted for altering the delivery of said pump in accordance with the elevation or depression of said float, valve control means adjustable to a position for admitting liquid from a supply source to the suction of said pump or from said source direct to the delivery connection of said chamber, an indicator calibrated to indicate the rate of consumption of liquid, and an operative connection between said float and said indicator whereby the indication given corresponds with the state of adjustment of said delivery means.

W. B. MITCHELL.